J. W. JONES.

Press for Book Binders.

No. 9,598. Reissued March 8, 1881.

WITNESSES

W. M. Weaver

James G. Parsons.

INVENTOR

Joshua W. Jones.

per Theophilus Weaver,

ATTORNEY.

UNITED STATES PATENT OFFICE.

JOSHUA W. JONES, OF HARRISBURG, PENNSYLVANIA.

PRESS FOR BOOK-BINDERS.

SPECIFICATION forming part of Reissued Letters Patent No. 9,598, dated March 8, 1881.

Original No. 233,625, dated October 26, 1880. Application for reissue filed December 10, 1880.

*To all whom it may concern:*

Be it known that I, JOSHUA W. JONES, of the city of Harrisburg, county of Dauphin, and State of Pennsylvania, have invented new and useful Improvements in Presses for Book-Binders, Paper-Makers, Printers, and for General Baling Purposes, my present invention being related to my patent dated June 11, 1878, and numbered 204,741, and to my patent dated March 4, 1879, and numbered 212,947, the principles of which are specially adapted to refitting and completing presses in a novel and useful manner, a hydraulic press being used as an illustration in the following specification.

The principal features of my improved press attachments are, first, in combination with my press attachment, termed a "head-block," a supplemental receiver detachably supported on the lower part of the press—that is, on the press-follower—and having in its face cross-ways for admitting therein bale-ties free of the contents of the press; second, a supplemental head-block detachably applied to the stationary part of the press opposite the press platen or follower, and having in it cross-ways, narrow at the surface, but widened as arm-holes in the interior of its body, to facilitate the application of bale-ties to bales in the press. I attain these objects by mechanism illustrated in the accompanying drawings, in which—

Figure 1:
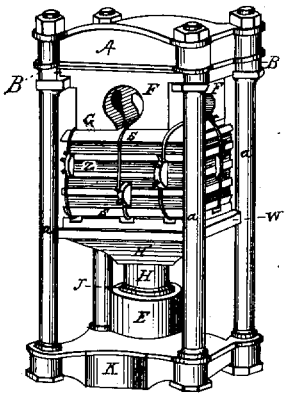
Figure 2:
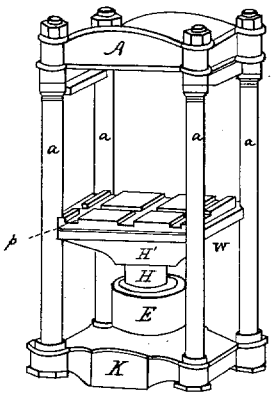
Figure 3:
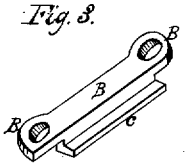
Figure 4:
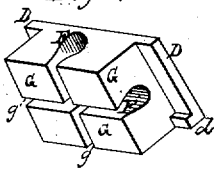
Figure 6:
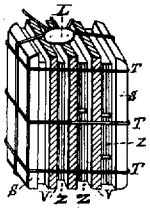
Figure 5:
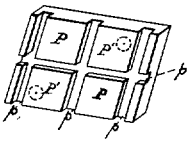

Figure 1 is a perspective view of a hydraulic press with my press attachments thereon, and showing inserted therein a composite bundle of papers and boards tied under pressure. Fig. 2 is a perspective view of a hydraulic press, showing on the platen thereof my receiver, and under the head thereof my ledge-pieces, for the insertion thereon of my supplemental head-block. Fig. 3 is a perspective view of one of said ledge-pieces. Fig. 4 is a perspective view of my improved head-block. Fig. 5 is a perspective view of my improved supplemental receiver. Fig. 6 is a perspective view of one of my composite bundles.

In the accompanying drawings, similar letters refer to similar parts throughout the several views.

The following reference to a hydraulic press is only incidental, to illustrate the mode of attaching my supplemental press attachments, which are likewise applicable to a screw, lever, or other press.

The hydraulic-press base K is connected, in the usual manner, with a water-supply and a discharge for the same. The uprights *a a a a* are embraced by the press-head A, which is bolted thereto as usual, excepting that the ledge-pieces B B are first inserted on said posts or uprights, as shown, before said head is put to its place thereon.

The letters E J H H′, respectively represent the press-cylinder, packing, ram, and press-platen. On the latter is applied my removable receiver P P, which is provided with cross-ways *p p p p* on its face, and has on its opposite side lugs at P′ P′, to hold it properly located on the press-platen by allowing said projections to enter corresponding mortises therein.

D D G G represent my improved detachable head-block, made supplemental to the upper end of the press, which has in it cross-ways, as shown at *g*, made narrow at the surface of said block, and made wide or enlarged at the openings F through it for passing the hand and the ties readily to place, as required in tying the bales or composite bundles, as shown in Figs. 1 and 6. Said head-block has on it the projections D D, which slide, drawer form, on the ledges *c* of the pieces B B. A lug, *d*, is provided, as shown, on said block, that it may be stopped thereby against the end of said ledge *c* when it is inserted far enough. I do not limit myself, however, to this method of applying said parts to place, as they may be attached detachably to the parts supplemented by bolts, and supports, on which to rest the projections on the said head-block, may also be attached to the press-uprights in any suitable manner.

In some forms of press the follower or platen is the upper part of the press proper, and my improved head-block is then attached to the under side of said platen, and my improved receiver is then rested and kept located on or raised above the press-bed.

The bundle shown in Figs. 1 and 6 is composed of press-boards S S at the ends of the same, and the division press-boards V V V and courses of folded sheets of paper or books Z, interposed between each pair of boards, all subjected to powerful pressure, and tied while in that condition by any suitable ties, T T T.

I am aware that the foregoing composite bundle is analogous to that covered by my Patent No. 204,741 for process on dry-pressing, hereinbefore referred to; but the employment of courses of paper, books, or other matter, alternated with press-boards, as shown, is a new and useful feature.

The press is cleared forthwith, as soon as the contents thereof are tied as indicated, and thus the operation of pressing is not delayed by leaving the work remain in the press, as heretofore; and thus much more work can be done by the press—as, for example, in paper-making, in which art folded sheets of paper in half-quires, quires, reams, &c., are subjected to hydraulic pressure to secure solid folding or packing. I, however, do not limit my invention to book-binders' and paper-makers' uses, as it can be employed on general baling-presses in the manner hereinbefore set forth.

I am aware that prior to my invention baling-presses contained a permanently-built slotted bottom or bed composed of sills, on which the matter was compressed and rested until tied into bales. I do not, therefore, broadly claim the slotted receiver; but I do claim it when made supplemental to and a detachable adjunct of the ordinary platen of a hydraulic press, or of the bed of screw, lever, or other presses. I likewise claim my supplemental head-block when made and applied as set forth on either of the said kinds of presses.

Having thus fully described my invention, what I desire to secure by Letters Patent of the United States is substantially as follows:

1. The supplemental head-block provided with the projections D *d* thereon, and with cross-ways *g g* and openings F F therein, in combination with the stationary parts of the press, all constructed and arranged for operation substantially as set forth.

2. The combination of the detachable receiver P *p* and the detachable head-block D G F *g* with the permanent parts of the press, all arranged for operation substantially as set forth.

In testimony that I claim the foregoing as my invention I have hereunto set my hand, in the presence of two witnesses, this 27th day of November, A. D. 1880.

JOSHUA W. JONES.

Attest:

THEOPHILUS WEAVER,
JNO. D. KINNEARD.